Patented Oct. 15, 1929

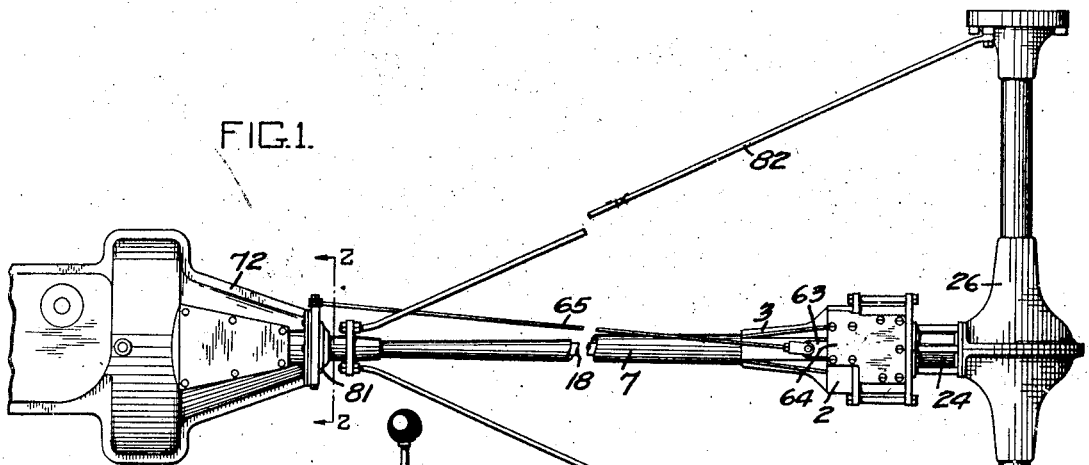
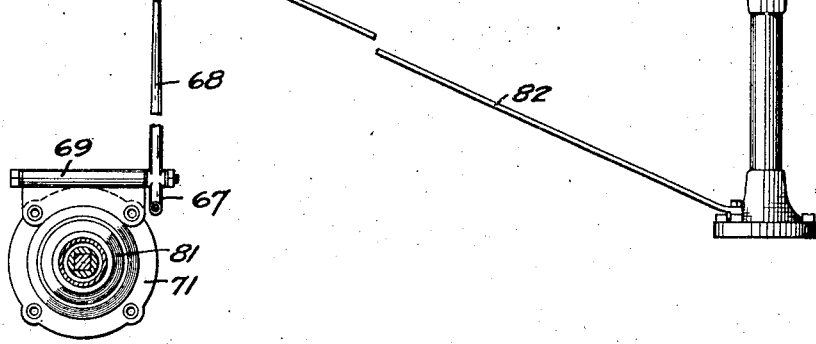
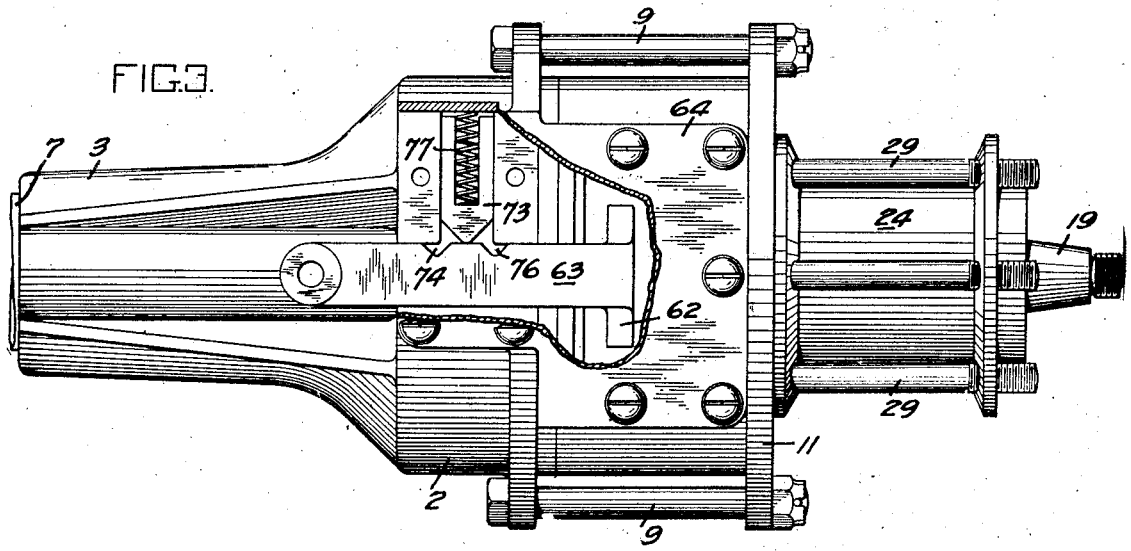

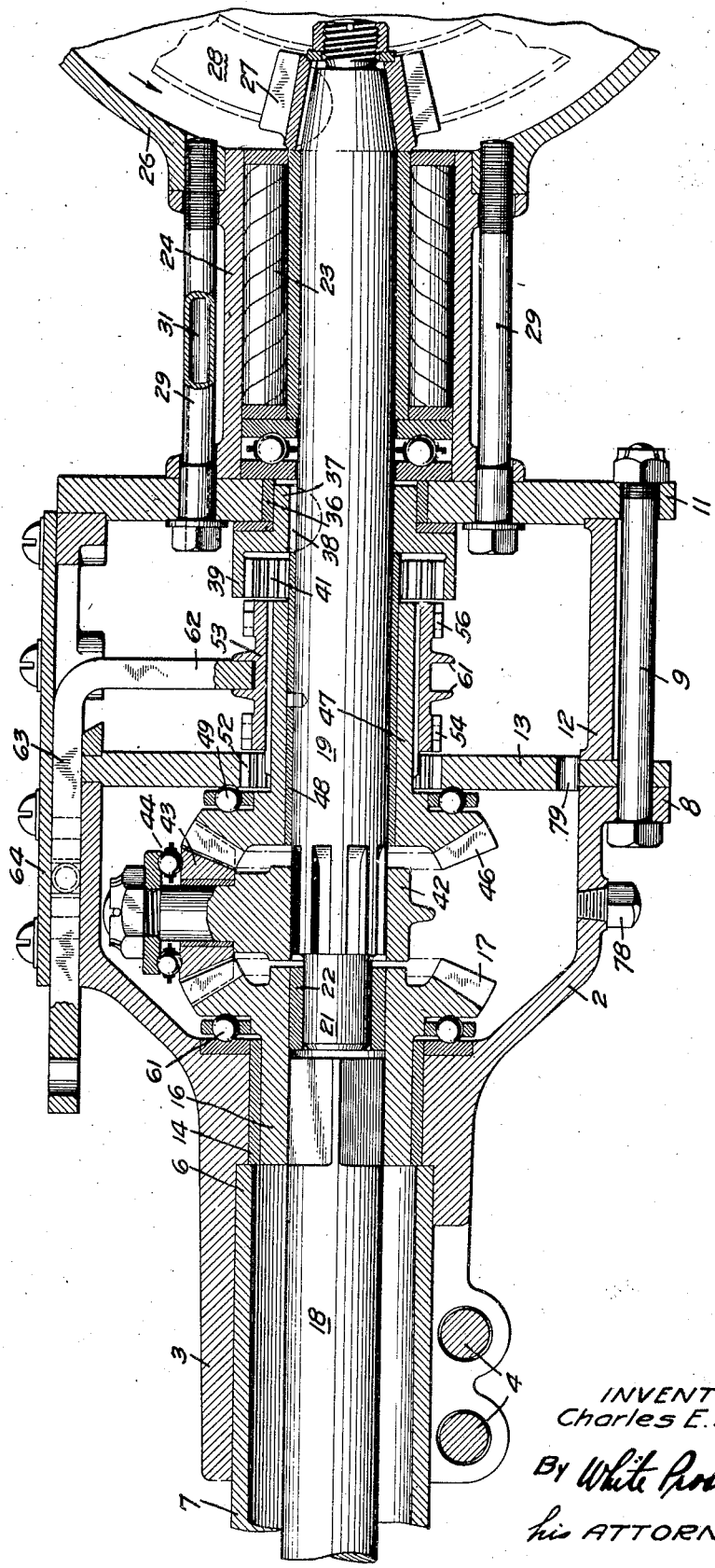

1,731,548

UNITED STATES PATENT OFFICE

CHARLES E. STARR, OF OAKLAND, CALIFORNIA, ASSIGNOR TO PERFECTO GEAR DIFFERENTIAL CO., OF OAKLAND, CALIFORNIA, A CORPORATION OF WASHINGTON

TRANSMISSION GEARING

Application filed October 13, 1924. Serial No. 743,465.

My invention relates to transmission gearing especially for use in automobiles, and one of the objects of the invention is the provision of a transmission unit adapted to be interposed in the propeller shaft of an automobile for the purpose of giving an additional range of speed changes.

Another object of the invention is the provision at a very low cost of a transmission unit adapted to be readily incorporated in an existing complete machine, in which the number of possible speeds is unduly limited, so that by the expenditure of a relatively small amount, an ample range of speed changes may be had.

Another object of the invention is the provision of an auxiliary transmission, by the use of which a speed less than high may be had without maintaining foot pressure on a control pedal.

Other objects of the invention together with the foregoing will be explained in the following description of my preferred embodiment of means for practicing the invention and which is illustrated in the drawings accompanying and forming part of the specification. It is to be understood that I do not limit myself to the showing made by the said description and drawings as I may adopt variations of my preferred form within the scope of my invention as set forth in the claims.

In the drawings;

Figure 1 is a plan view of my transmission unit showing the same interposed in the torque tube and propeller shaft of a well known make of automobile, of which the rear axle housing, the torque tube, and a portion of the power plant assembly are shown.

Figure 2 is a vertical sectional view taken in a plane indicated by the line 2—2 of Figure 1.

Figure 3 is a plan view of my transmission unit before assembly in the automobile. A part of the casing is broken away to disclose the structure.

Figure 4 is a vertical sectional view of my transmission taken in a plane passing thru the longitudinal axis of the propeller shaft. At the left the severed end of the torque tube is shown enclosed within the casing of my transmission, and at the right is shown a part of the rear axle housing.

It is a widely recognized fact that one of the most popular of the low priced automobiles does not provide a sufficient number of speed changes and in low gear, the control pedal must be held by the foot in depressed position against spring tension. Many efforts have been made by various inventors to supply by means of attachment or auxiliary device, means for obviating these objectionable features. From a mechanical point of view, a number of these have been highly satisfactory, but since the price of the new car is only a few hundred dollars, it is obvious that the purchaser of such a car will not be a likely prospect for an expensive auxiliary device, no matter what its advantages may be. The inventor's problem, therefore, is not merely mechanical but also commercial; that is, he must not only supply a mechanically satisfactory job, but it must be of such a nature that it can be manufactured and sold at a price range within the reach of the probable buyers. The invention described herein fulfills these terms. By a few simple operations within the capacity of any ordinary mechanic, and at low cost, my transmission unit may be interposed in the propeller shaft and torque tube of the car for which it is designed, and by its use the previous number of speed changes is doubled; that is, instead of two forward speeds and one reverse speed, the owner of a car in which my transmission is incorporated has four forward speeds and two reverse speeds, and at a cost which is about one-half that of the best known and most widely used of the auxiliary devices for accomplishing a similar result.

In broad terms my invention comprises a casing adapted to be interposed between the severed end of the torque tube and the roller bearing housing at the rear end of the propeller shaft. Means are provided for clamping the casing securely in place on the torque tube and to the bearing housing, and speed change gears are provided in the casing adapted to be interposed in the propeller shaft. A control lever and connections complete the assembly.

My transmission is housed within a closed casing comprising the portion 2, which is provided at one end with a split neck 3, adapted by means of the bolt 4, to be clamped firmly about the severed end 6 of the torque tube 7. The other end of the portion 2 is provided with a flange 8, thru which bolts 9 pass to the end wall 11 of the casing. Between the end wall and the casing portion 2, the casing portion 12 and the fixed ring 13 comprising a hollow clutch member are clamped.

Having a bearing in the bushing 14, arranged within the casing portion 2, is the hub 16 of the beveled gear 17, mounted upon the squared severed end of the propeller shaft 18.

Axially alined with the propeller shaft or driving shaft 18, is the driven shaft 19 of my transmission, having a stud end 21 seated in the bushing 22, which in turn is mounted within the hub 16 of the gear 17. The shaft 19 extends rearwardly thru the fixed ring 13 and the end wall 11 of the casing, into the roller bearing 23 which journals the shaft in the housing 24, interposed between the casing wall 11 and the rear axle housing 26. The original bearing and housing is retained, and the driving pinion 27 is removed from the original propeller shaft and mounted on the shaft 19 in mesh with the master gear 28, as in the original assembly.

Transmission casing, roller bearing housing and rear axle housing are secured together by the screws 29, one of which is formed with a passage 31 extending therethru, so that lubricant from the rear axle housing thrown off from the meshed gears 27 and 28 can pass from the rear axle housing into the transmission casing. Except for the hollow screw 31, the original roller bearing assembly and pinion 27, are used unchanged, the parts which I supply being designed and proportioned to be assembled with these parts without trouble.

Having a bearing within the bushing 36, arranged in the rear wall 11, is the ring 37 mounted for rotation with the shaft 19 by means of the keys 38. This ring 37 extends forwardly in the flange 39, on the inner side of which are formed clutch teeth 41. Adjacent the forward end of the shaft 19 is a planet gear mounting 42, splined to the shaft so that it turns therewith. A planet gear or pinion 43 is journaled on the mounting 42, at intervals of 120°, and a thrust bearing 44 is provided for each planet pinion to retain it in position. On one side, the planet pinion is in mesh with the gear 17 and on the opposite side with a gear 46, having a hub 47, and loosely journaled on the bushing 48 between it and the shaft 19. A thrust bearing 49 interposed between the gear 46 and the ring 13, absorbs the thrust of the pinion on this side and a similar thrust bearing 51 interposed between the gear 17 and the casing part 2 absorbs the thrust in the opposite direction.

The ring 13 on its inner face which is preferably of the same size as the flange 39 on the ring 37, is provided with clutch teeth 52. Between the fixed ring 13 and the ring 39 is a collar 53 mounted for rotation with the hub 47 of the gear 46 and slidable thereon axially. On one end of the collar are clutch teeth 54, adapted to engage the teeth 52, when the collar is moved to the left, and on the other end are clutch teeth 56 adapted to engage the teeth 41 when the collar is moved to the right, as viewed in Figure 4.

Since the locking ring 13 is fixed to the housing the engagement of the teeth 54 in the locking ring 13 results in holding the gear 46 from rotating. Rotation of the shaft 18 by the engine therefore effects a planetation of the planet pinions 43, and a consequent rotation of the shaft 19 at a lower speed. Engagement of the teeth 56 with the teeth 41 however, locks the gear 46 to the shaft 19, and since the planet gear mounting is already locked to the shaft 19, rotation of the planet pinions is prevented, and rotation of the shaft 18 therefore drives the shaft 19 at the same speed; that is to say, the parts are locked together and revolve as one.

Means are provided for shifting the clutch collar 53 to engage the fixed locking ring or the shaft locking ring. Arranged on the periphery of the clutch collar are spaced flanges 61 between which the yoke 62 engages. At the upper end of the yoke, a bar 63 extends thru a slide-way formed in the upper portion of the casing and below the cover plate 64, to the outside of the casing, where it is provided with a pivotally connected link 65, extending forwardly to a pivotal connection with the lever arm 67, integral with the lever arm 68 which extends thru the floor of the car into convenient position for the hand of the driver. The lever 67—68 is pivotally mounted on a bracket 69 which is conveniently mounted on the flange 71 at the end of the power plant assembly 72.

In order to provide means for resiliently holding the clutch collar in engagement with either of the locking rings, I mount the pointed pin 73 in a suitable slide-way in the top of the casing below the cover plate 64, and provide notches 74 and 76, in which the pointed end of the pin may engage. A spring 77 tends to press the pin into the notches when the bar 63 is moved from one side to the other, and resiliently resists the change from one position to the other, so that the application of a reasonable amount of force is necessary to shift the clutch collar.

In order to permit the free flow of lubricant in the casing 2—12 I provide an aperture 77 in the ring 13 adjacent the bottom of the casing. An aperture normally closed by the plug 78 provides means for draining the casing when necessary.

The proportion of the gears is such that in conjunction with the speeds already possible with the shaft 18, the following speed changes of desirable magnitude are secured:

First or high, in which the engine and propeller shaft including the shaft 19 of my transmission are revolving as one at engine speed.

Second speed, in which the shaft 18 is rotating as one with the engine, and the planetation of the pinions 43 effects a reduction of speed in the shaft 19.

Third speed, secured by the operation of the main transmission and in which the shafts 18 and 19 are locked to rotate as one.

Fourth speed or low in which the shaft 18 is driven at its low speed by means of the main transmission, and by means of my transmission the shaft 19 is still further reduced in speed.

Reverse speed, the normal reverse speed is unchanged if my transmission is set, so that the shafts 18 and 19 revolve as one; and an additional slower reverse speed may be secured by engaging the clutch collar with the fixed locking ring 13, so as to effect the planetation of the pinions 43.

From this it will be apparent that when it becomes necessary for the driver of an automobile equipped with my transmission, to drop into a lower gear ratio than high, a second speed which will suffice for ordinary grades is available. To secure this, only the reduction lever 68 need be moved, so that in this reduction, the constant pressure of the foot on a control pedal is unnecessary. Heretofore, the necessity of maintaining the control pedal in the depressed position on long grades has proved very tiring.

From the above it will be understood that in installing my transmission, the cutting off of the torque tube and the squaring of the severed end of the propeller shaft constitute the major portion of the work, the remainder being merely the assembling of parts which readily fit together. It will of course be understood that my transmission could be interposed at any point in the torque tube, and might be inserted farther forward, adjacent the universal joint 81. By placing it in the position shown in figure 1 however, I am enabled to retain the original radius rods 82, and for this reason I prefer to install the transmission in the position shown.

I claim:

1. A transmission comprising a driving shaft, a driven shaft, a planet gear mounting fixed on the driven shaft, a planet gear journaled on said mounting, a gear in mesh with said planet gear and fixed on the driving shaft, a loose gear in mesh with the planet gear, a fixed element, a locking ring fixed directly on and mounted for rotation with the driven shaft, and a collar splined to the loose gear and slidable in one direction to engage the fixed element or in the other direction to engage said locking ring regardless of the directional rotation of the shafts.

2. A transmission comprising a driving shaft, a driven shaft, a planet gear mounting fixed on the driven shaft, a bevel pinion journaled on said mounting, a bevel gear in mesh with said bevel pinion and fixed on the driving shaft, a loose bevel gear in mesh with the bevel pinion, a fixed locking ring, a second locking ring fixed directly on and mounted for rotation with the driven shaft, and a collar mounted for rotation with the loose gear and slidable to engage either locking ring regardless of the directional rotation of the shafts.

3. A transmission comprising a support adapted to form an enlarged portion of the torque tube of an automobile, a driving shaft and a driven shaft journaled in said support, a planet gear mounting fixed for rotation with the driven shaft, a planet pinion journaled on said mounting with its axis in a plane perpendicular to the axis of said mounting, a gear in mesh with said pinion and fixed for rotation with the driving shaft, a loose gear in mesh with said pinion, fixed thrust bearings cooperating with each of said gears to prevent axial movement thereof, a hollow clutch ring fixed to the support, a clutch ring fixed to the driven shaft, and a clutch collar splined to the loose gear and adapted to telescope into clutching engagement with the hollow clutch ring when moved in one direction or to engage the driven shaft clutch ring when moved in the other direction.

4. A transmission comprising a fixed support adapted to form an enlarged portion of the torque tube of an automobile, a driving shaft and a driven shaft journaled in said support, a planet gear mounting fixed for rotation with the driven shaft, a planet pinion journaled on said mounting with its axis in a plane perpendicular to the axis of said mounting, a gear in mesh with said pinion and fixed for rotation with the driving shaft, a loose gear in mesh with said pinion, fixed thrust bearings cooperating with each of said gears to prevent axial movement thereof, a hollow clutch ring fixed to the support, a clutch ring fixed to the driven shaft, and a clutch collar splined to the loose gear and adapted to telescope into clutching engagement with the hollow clutch ring when moved in one direction or to engage the driven shaft clutch ring when moved in the other direction, said support comprising a housing enclosing the rotating members.

5. A transmission comprising a fixed support adapted to form an enlarged portion of the torque tube of an automobile, a driving shaft and a driven shaft journaled in said support, a bevel gear fixed to the drive shaft and journaled on the driven shaft, a loose bevel gear journaled on the driven shaft, a planet pinion mounting splined on the driven shaft and provided with radial journals, bevel planet pinions mounted on said journals and in mesh with said two gears, thrust bearings cooperating with both of said gears to prevent axial movement thereof, a fixed locking ring on the support, a second locking ring fixed for rotation with the driven shaft, and a collar mounted for rotation with the loose gear and slidable to engage either locking ring.

6. A transmission comprising a support adapted to form an enlarged portion of the torque tube of an automobile, a driving and a driven shaft journaled in said support, a planet pinion mounting fixed for rotation with the driven shaft, a bevel pinion journaled on said mounting, a bevel gear in mesh with said bevel pinion and fixed for rotation with the driving shaft, a loose bevel gear in mesh with the bevel pinion, a fixed locking ring secured to the support and extending transversely thereof, a second locking ring fixed to the driven shaft independently of said planet pinion mounting, and a collar splined to the loose gear and slidable to engage either locking ring regardless of the directional rotation of the shafts.

7. A transmission comprising a housing, a driving and a driven shaft journaled within said housing, a planet pinion mounting fixed on the driven shaft, a bevel pinion journaled on said mounting, a bevel gear in mesh with said pinion and fixed on the driving shaft, a loose bevel gear in mesh with the bevel pinion, a fixed locking ring constituted as a median transverse reinforcing web of the housing, a second locking ring fixed for rotation with the driven shaft, and a collar mounted for rotation with the loose gear, and slidable to engage either locking ring.

8. A transmission comprising a driving shaft, a driven shaft, a planet gear mounting fixed on the driven shaft, a planet gear journaled on said mounting, a gear in mesh with said planet gear and fixed on the driving shaft, a loose gear in mesh with the planet gear including a hub journaled on the driven shaft, a fixed element, a locking ring fixed for rotation with the driven shaft, and a collar splined to the hub and slidable in one direction to engage the fixed element or in the other direction to engage said locking ring.

9. A transmission comprising a driving shaft, a driven shaft, a planet gear mounting fixed on the driven shaft, a bevel pinion journaled on said mounting, a bevel gear in mesh with said bevel pinion and fixed on the driving shaft, a loose bevel gear in mesh with the bevel pinion including a hub journaled on the driven shaft, a fixed locking ring, a second locking ring fixed for rotation with the driven shaft, and a collar splined to the hub and slidable to engage either locking ring.

10. A transmission comprising a pair of alined shafts, a planet gear mounting fixed on one of said shafts, a planet gear journaled on said mounting, a gear in mesh with said planet gear and fixed on the other shaft, a loose gear in mesh with the planet gear, a locking ring fixed for rotation with the planet gear mounting and spaced therefrom, a fixed element between the locking ring and planet gear mounting, and a collar splined to the loose gear and slidable in one direction to engage the fixed element or in the other direction to engage said locking ring.

In testimony whereof, I have hereunto set my hand.

CHARLES E. STARR.